June 18, 1957 R. L. CARLSTEDT 2,795,977
BORING MACHINES FOR METAL
Filed July 20, 1954 3 Sheets-Sheet 1

INVENTOR.
RAGNAR L. CARLSTEDT
BY
ATTORNEYS

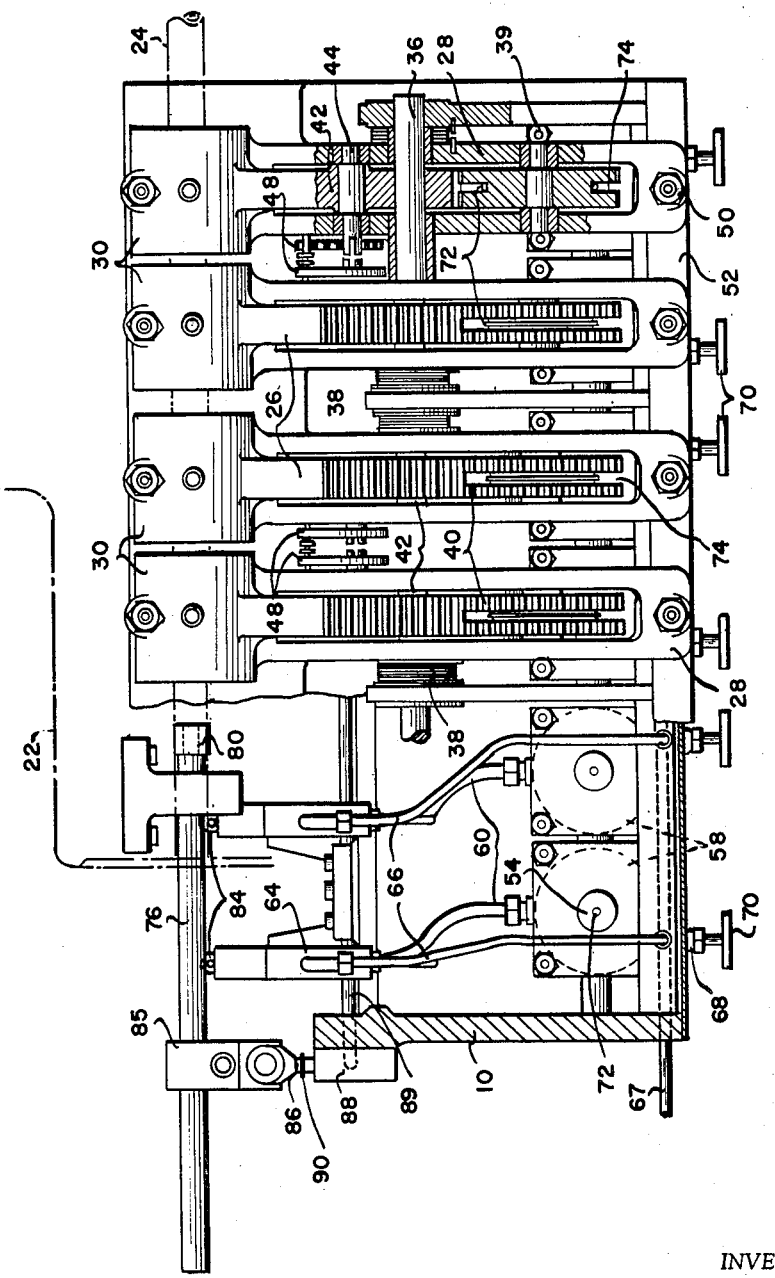

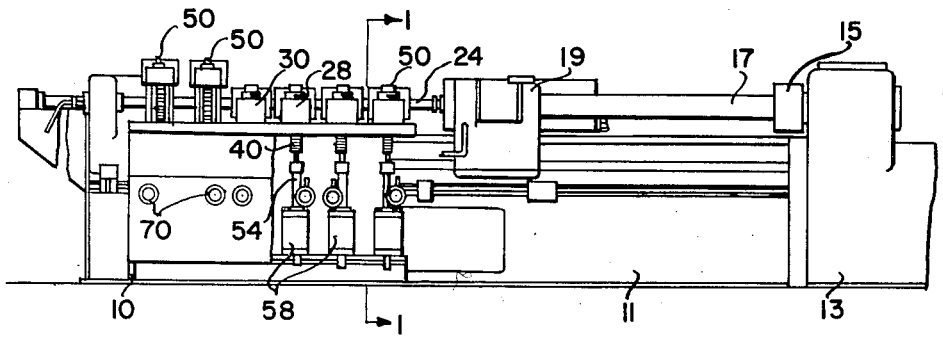
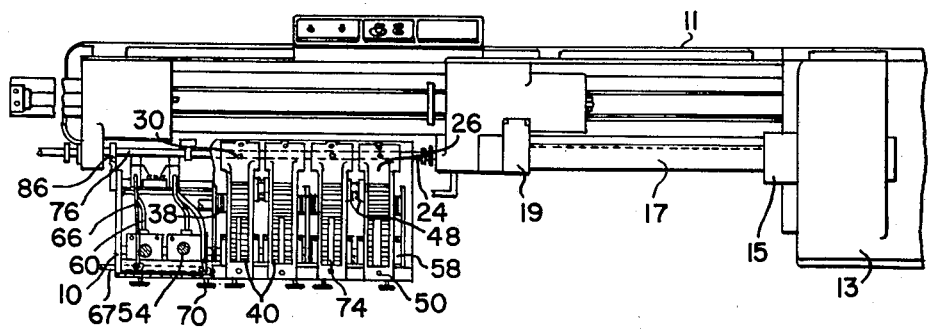

United States Patent Office 2,795,977
Patented June 18, 1957

2,795,977
BORING MACHINES FOR METAL

Ragnar Leonard Carlstedt, Hagersten, Sweden, assignor to DBH Corp., New York, N. Y., a corporation of New York Application July 20, 1954, Serial No. 444,559

6 Claims. (Cl. 77—4)

This invention relates to boring machines for metal comprising a support, a slide displaceable thereon and carrying the boring shaft, and a holder device for the workpiece. In machines of this type which operate with boring depths up to 30 metres it constitutes a problem difficult to overcome how to avoid vibrations and creation of breaking stresses due to the tendency of the boring shaft to lateral bending movements.

The objects of the invention are to eliminate said difficulties and to provide a guide system for the shaft, which is automatically operated to move away from the slide and the shaft as the boring operation proceeds and the shaft thus enters into the workpiece.

Further objects and advantages of the invention will be apparent from the following description considered in connection with the accompanying drawings which form part of this specification, and of which:

Fig. 2 is a partly sectional top view of the machine shown in Fig. 1, certain parts illustrated in said figure being cut away.

Figure 3 is a side elevational view of a boring machine provided with a boring bar support according to the present invention.

Figure 4 is a plan view of the machine of Figure 3.

Figure 1:
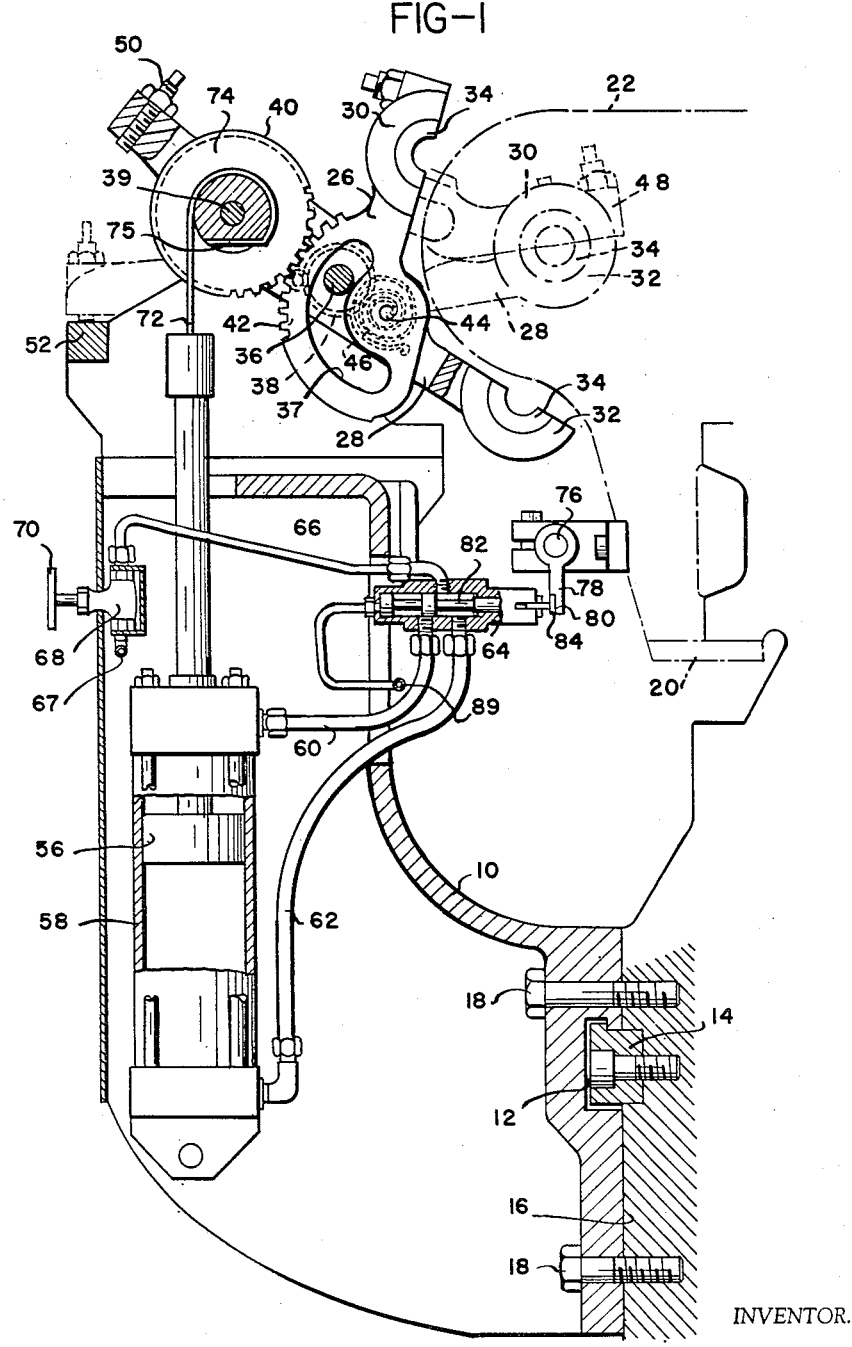
Fig. 1 is a cross-section of a boring machine embodying the invention.

Referring generally to Figures 3 and 4, the frame of the machine is indicated at 11, and at 13 there is an arrangement providing a rotary workholder support 15 that engages one end of a workpiece 17 at the opposite end of which is engaged by a clamp 19 slidably mounted on frame 11, so that the workpiece is held between the clamp and support 15 while support 15 is driven in rotation to drive the workpiece.

The work member 17 is to have a long hole bored therein, and to this end an elongated boring bar or boring shaft is provided that is pushed against the end of the rotating work member through the clamp 19, and bores a hole in the workpiece due to cutting edges on the boring shaft and the rotation of the workpiece.

The present invention is particularly concerned with supporting the elongated boring shaft against deflection during its advancing movement into the workpiece. This advancing movement is accomplished by a boring head that is slidably mounted on frame 11, and which is moved toward work member 17 in order to push the boring shaft therein.

Referring now to Figures 1 and 2 taken in connection with Figures 3 and 4, 10 designates a support which by means of a groove 12 and a guide bar 14 engaging said groove is displaceable along a bed 16 and lockable in desired position by means of screws 18. In known manner a sliding bore head or boring slide indicated at 22 by a dash-dotted line is disposed slidably along the support 10 on a guide 20. Between said slide and the holder device presented in the drawings for a workpiece a number of guide members adapted to support the boring shaft 24 indicated in Fig. 2 by dash-dotted lines are provided side by side on the support 10. These guide members which usually are denominated as steadyrests consist of a pair of jaws 30, 32 mounted on arms 26, 28, respectively. Each pair of jaws is formed so as to be capable of being closed with bearings 34 around the boring shaft and in this manner to act as supports for said shaft. Said jaws are, on the other hand capable of being spaced from one another in their sequence so much as to permit the slide 22 to pass freely between them as it moves in a direction towards the workpiece. To cause movement of the jaws the pivot arm, for example the lower one denoted by 28, is pivotable on a shaft 36 which in the direction to the closing position rotates against the pressure of a helical spring 38. On the opposite side relatively to the jaw 32 of said shaft said arm carries a gear 40 freely rotatable around a shaft pivot 39 and engaging a toothed segment 42 provided on the pivot 26. This latter is rotatably mounted on a shaft arm 44 rigidly secured onto the arm 28. The rotating movement of the arm 26 is performed against the pressure exerted by a helical spring 46. The shaft 36 which is common to all steadyrests, is received in an oblong, part-circular groove 37 disposed within the toothed segment 42. When forcing the gear 40 to move downwardly, for example, in the drawing plane of Fig. 1, under simultaneous rotation due to the action of a device to be explained in detail hereinafter, the arm 28 is turned about the shaft 36 and the jaw 32 is forced upwardly. At the same time the rotation of the gear 40 causes a turning of the segment 42, too, resulting in a downwardly directed movement of the arm 26 and in connection therewith of the jaw 30 until the jaws meet as is indicated at 48 by dash-dotted lines. For adjustment of its movement the arm 28 carries a setting screw 50 which is mounted on a projection extending beyond the gear 40 and which is adapted to be moved against a stop 52 provided on the support 10. By suitably adapting the pressure exerted by the springs 38, 46 on the shaft 36 and the arm 26, respectively, to the forces acting on the gear 40 it is possible to cause either the one or the other of the jaws 30, 32 to be the first to bring its bearing 34 into contact with the boring shaft 24.

The device actuating the gear 40 of each of the steadyrests is in the embodiment illustrated in the drawings constituted by a series of servo-motors operated by compressed air. Said operation may, however, be effected also by using some other pressure fluid or by means of electricity or by solely mechanical means. Every steadyrest has its separate servo-motor comprising a piston rod 54 carrying a piston 56 slidable in a cylinder 58. Compressed air is supplied to said cylinder on the one or the other side of the piston 56 through conduits 60, 62 controlled by a common valve 64 to which compressed air is supplied from a conduit 66. Each conduit 66 is provided with a valve 68 each controlled by means of a hand wheel 70 each for every steadyrest. A common supply conduit for compressed air is designated by 67. The piston rods 54 in the various servo-motors are connected to the gears of the steadyrests with which they cooperate, by means of a wire 72 entering a peripherical groove provided in said gear, the end 75 of said wire being secured to the base of said groove. When compressed air is supplied due to control by the valves 64 alternately above and below the piston 56, the wire will cause a rotation of the gear 40 and simultaneously a turning movement of the arm 28. As will be understood easily, there is no necessity of compressed air actuating the piston 56 from below, since the springs 38, 46 provoke the opening movement of the jaws 30, 32, but it is advantageous to use compressed air for this purpose also in order to release said springs from the task of displacing the piston together with the piston rod. The control of the valves 76 is effected by means of an operating rod 64 provided on the slide 22 and carrying suitably spaced actuating members 78 which when meeting the valves 64 with inclined surfaces 80 abut against rolls 84 connected to the valve stems 82 of said valves. In response to the movement of the slide said rolls 84 roll upwardly on said inclined surfaces and direct through the valve stem 82 to which they are connected, the compressed air to the respective cylinder. In the position as illustrated in Fig. 1 the roll 84 has just passed upwardly on the inclined surface 80 so that the valve body 82 is displaced to its left-hand end position. Compressed air is now directed from the conduit 66 to the lower side of the piston 56 through the conduit 62 so that the piston is displaced upwardly. The steadyrest is open and the slide 22 can freely pass the same. At those steadyrests which still have not been forced to leave space for the slide the valve stem 82 is in its right-hand end position according to Fig. 1 in which the conduits 66 and 60 are in open communication so that the pistons 56 of these steadyrests are in their lower end position. In order to be capable on return of the slide past all steadyrests then open, to close the jaw pairs of all of the steadyrests simultaneously the operating rod is further provided with a member 85 having inclined surfaces 86 controlling a valve 88. The valve 88 controls a conduit 89 for compressed air which is connected with the left-hand side (Fig. 1) of the housings for all the valve bodies 82. When the arm 90 of the valve 88 is moved up on the inclined surface 86 compressed air is directed through the conduit 89 whereby all valve bodies 82 are reversed to the position in which the pistons 56 receive compressed air on their upper side. The pistons are displaced downwardly so that all steadyrests are closed. When the member 85 has passed the valve 88 its arm 90 is reversed upwardly and the pressure in the conduit 89 is unloaded. This last mentioned member may be adjusted so as not to actuate any of the valves. The valves 68 make possible by means of the hand wheel 70 individually to cause each of the steadyrests to assume open position, for example when performing the boring operation with boring tools mounted on shafts shorter than those for which the machine is constructed in its entirety, or when desiring to repair an individual steadyrest.

The machine described above operates with a rotating workpiece, but the principles for the present invention are also adaptable when the boring tool is rotated and the workpiece is rotationally stationary or when both the boring tool and the workpiece are rotated. It has also been assumed in the embodiment illustrated that the jaws 30, 32 register to one another, but said assumption does not constitute a condition.

While one more or less specific embodiment of the invention has been shown and described, it is to be understood that this is for the purpose of illustration only and that the invention is not to be limited thereby, but its scope is to be determined by the appended claims.

What I claim is:

1. In a machine of the character described comprising a support, a slide displaceable on the support, a boring shaft carried by the slide and a holding device for a workpiece, guide members disposed between said holding device and said slide for laterally guiding said boring shaft, each of said members consisting of a pair of pivotally mounted jaw elements each provided with a bearing for the boring shaft, spring means for biasing said elements away from said shaft, one of said jaw elements being pivotally mounted on the other, and each of said elements carrying toothed gear segments interengaging to cause the jaw ends of said elements to move to closed position against the action of said spring means when said other one of said jaw elements is moved toward closed position.

2. In a boring machine as claimed in claim 1 having separate pressure-fluid actuated servo-motors for each of said guide members, each of said servo-motors comprising a cylinder and a piston within said cylinder, a valve controlled by the movement of said slide and adapted to supply pressure fluid to one side of said piston so as to open said jaws.

3. In a boring machine as claimed in claim 1 having separate pressure-fluid actuated servo-motors for each of said guide members, each of said servo-motors comprising a cylinder and a piston within said cylinder, said piston being through a flexible member in driving connection with said gear, and a valve controlled by the movement of said slide and adapted to supply pressure fluid to one side of said piston so as to open said jaws.

4. In a boring machine as claimed in claim 1, a manually operated device for each guide member adapted to control them individually and independent of the movements of the slide.

5. In a boring machine as claimed in claim 1, a device controlled by the movements of the slide and adapted to cause a simultaneous closing movement of the jaws of all guide members.

6. In a machine of the character described and comprising a support, a slide displaceable along the support, an elongated boring shaft carried by the slide, a holding device for a workpiece to be bored by said shaft, and guide members arranged in spaced relation along the support between said holding device and said slide for supporting the shaft against deflection lateral to its length, each of said members comprising a pair of jaw elements, said jaw elements being provided with bearings for engaging the boring shaft when the jaw elements are closed about the shaft, said jaw elements being pivoted together and one thereof being pivoted to said support at a point different from the pivotal interconnection of the jaw elements, spring means biasing said jaw elements apart and away from said shaft, and means connecting said jaw elements for simultaneous movement toward and away from each other whereby the movement of one of said jaw elements toward the shaft will be occasioned by movement of the other thereof toward the shaft also.

References Cited in the file of this patent
UNITED STATES PATENTS

| | | |
|---|---|---|
| 1,219,078 | Calahan | Mar. 13, 1917 |
| 1,961,091 | Smith et al. | May 29, 1934 |
| 2,633,762 | Cudini | Apr. 7, 1953 |